May 19, 1936.  G. G. MORENO  2,041,011
APPARATUS FOR ADVANCING FILM
Filed May 22, 1934   2 Sheets-Sheet 1
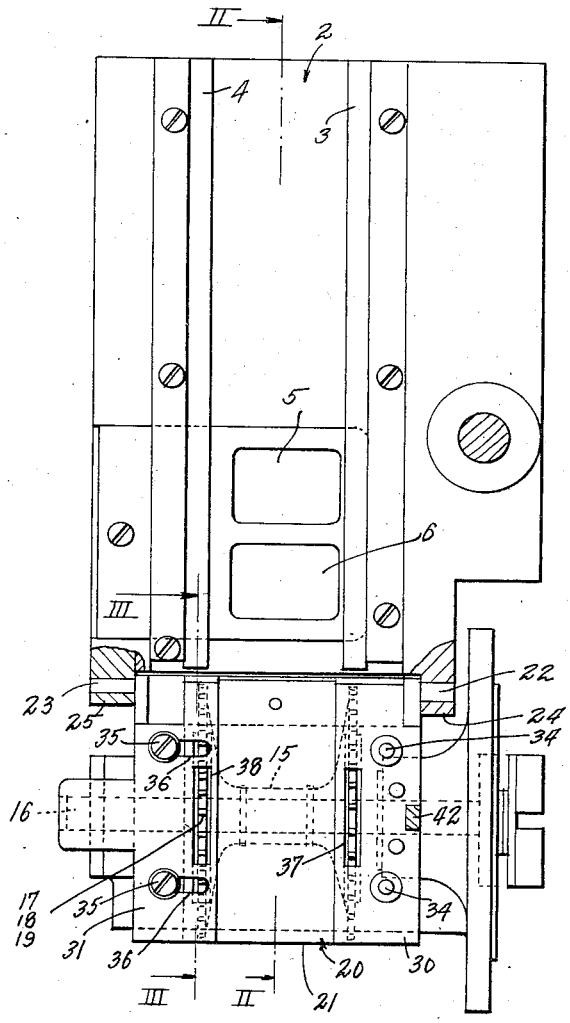
Fig. 1.
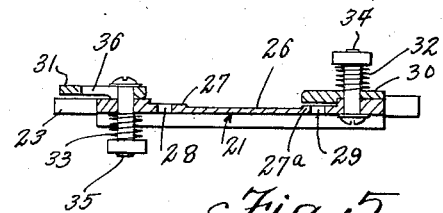
Fig. 5.
Fig. 6.
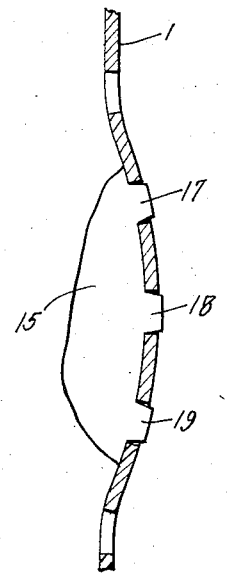
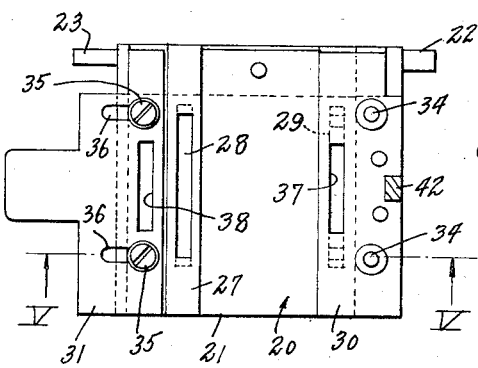
Fig. 4.
Inventor
Gabriel Garcia Moreno
By Lyon & Lyon
Attorneys May 19, 1936.　　　G. G. MORENO　　　2,041,011
APPARATUS FOR ADVANCING FILM
Filed May 22, 1934　　2 Sheets-Sheet 2
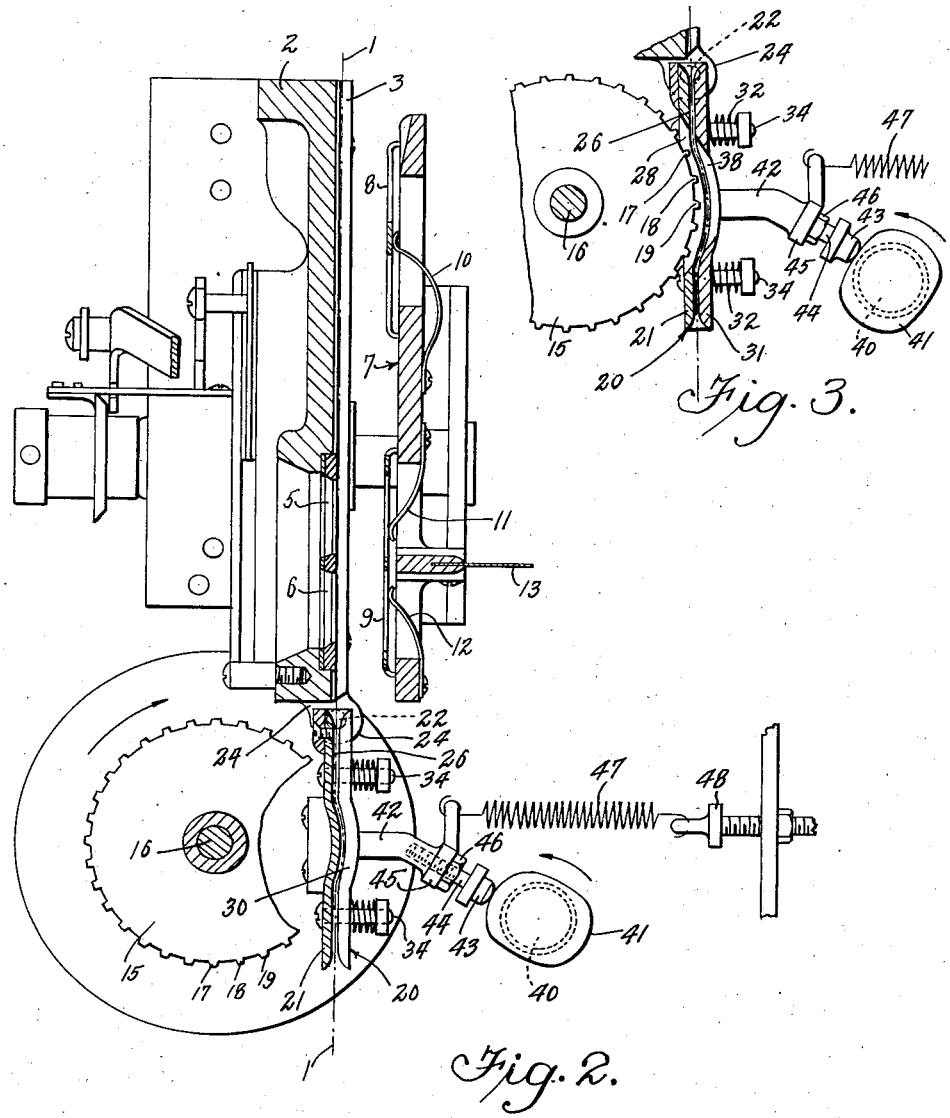
Inventor
Gabriel Garcia Moreno
By Lyon & Lyon
Attorneys Patented May 19, 1936

2,041,011

UNITED STATES PATENT OFFICE 2,041,011

APPARATUS FOR ADVANCING FILM

Gabriel Garcia Moreno, Los Angeles, Calif., assignor, by direct and mesne assignments, to C M C Corporation, New York, N. Y., a corporation of Delaware Application May 22, 1934, Serial No. 726,884

6 Claims. (Cl. 88—18.2)

This invention relates to a new and improved method of intermittently advancing strip film bearing photographic records of images, sound, etc. The invention also relates to a simple and efficient arrangement and combination of elements whereby various existing devices, such as cameras, projectors, printers, and other film-treating machines utilizing intermittent movement, may be readily adapted to the performance of the method.

The method and apparatus of this invention will be specifically described hereinafter in their relation to the intermittent movement of standard 35 millimeter film. This is being done for purposes of illustration only and it is to be understood that strip film of various sizes, type of perforations or sprocket holes, etc., may be similarly treated, suitable and readily apparent modifications being made in the size and configuration of the illustrative form of apparatus herein described for the purpose of adapting the same to different forms of strip film.

Normally, whenever it is desired to intermittently advance 35 millimeter film, intermittent sprockets having a diameter of about 24 millimeters and carrying 16 teeth are used. Such intermittent drive sprockets are driven in any suitable manner as, for example, by means of a star cam or Venetian movement designed to longitudinally advance the film a distance equivalent to the height of a normal frame area, namely, about 18.9 millimeters. When it is desired to change the length of film intermittently advanced, it has been thought necessary to change the entire intermittent movement, including star cam, etc., or to increase the size of the intermittent sprocket and gear it to existing intermittent drive shaft so as to increase the peripheral speed or length of film advanced by the sprocket.

For example, a co-pending application filed by me describes a method of projecting cinematographic films in which it is desired to intermittently advance the film longitudinally a distance twice that advanced during normal projection or photography. It has been found, however, that when the driving sprocket is enlarged and geared to the existing drive shaft, the relationship between shutter speeds and film speed, or shutter speeds and periods of movement and rest of the film, are substantially changed so that proper projecting or photographing conditions do not exist.

Furthermore, it is to be remembered that in the normal intermittent drive means used heretofore, the film is constantly in contact with the intermittently driven sprocket and there is a tendency for mechanical vibrations to be transmitted to the film. In a co-pending application Serial No. 706,839, an apparatus for intermittently advancing strip film has been described which solves some of these difficulties. The present application may be said to be a continuation-in-part of the prior application Serial No. 706,839.

I have discovered that in order to prevent longitudinal movement of the film within the film gate, it is necessary to maintain the various units composing the intermittent movement and adjacent elements in a definite relationship to one another. As hereinafter described in detail, it has been found necessary to maintain the film in substantially a single plane during its passage through the film gate under the influence of the intermittently driven sprockets.

The present invention therefore relates to improvements in devices for intermittently advancing strip film whereby the film is maintained in a stationary and positively registered position without the use of separate registering means.

An object of this invention is to disclose and provide a method of intermittently advancing strip film longitudinally in which the film is moved transversely into and out of engagement with a combined driving and registering sprocket.

Another object is to disclose and provide a sprocket construction which intermittently moves and simultaneously registers the film.

A further object is to disclose and provide an arrangement of elements whereby film may be intermittently advanced in an efficient manner on existing types of film-treating machines with but a minimum amount of mechanical change in existing forms of apparatus.

These and other objects, uses and advantages of the invention will become apparent to those skilled in the art from the following detailed description of a preferred method of carrying out the invention and an illustrative form of apparatus which may be used in the performance of the method.

In describing the invention, reference will be had to the appended drawings, in which:

Fig. 1 is a front view slightly broken away, showing the relationship between the film gate, guide and intermittent sprocket.

Fig. 2 is a vertical section taken along the plane II—II indicated in Fig. 1.

Fig. 3 is a vertical section of a portion of the device shown in Fig. 1, the section being taken through a plane indicated at III—III in Fig. 1.

Fig. 4 is a front elevation of the film-controlling device or guide with one of the shoes in position for the insertion of film.

Fig. 5 is a transverse section taken along the plane V—V indicated in Fig. 4.

Fig. 6 is an enlarged view, partly diagrammatic, showing the relationship between the teeth of the sprocket and the film when the film is in driving and registering engagement with the teeth.

In the drawings a double gate is shown whereby two adjacent frames of strip film may be simultaneously projected. The film is generally indicated by the numeral 1 and extends through the gate member 2 between longitudinal guide rails 3 and 4. The gate 2 is preferably longer than normal gates so that a greater length of film is held in contact with the gate and between the guide rails 3 and 4 than is generally the case. The film passes in front of the apertures 5 and 6 through which projection is had. The film is yieldably pressed against the gate 2 by means of a pressure plate, generally indicated at 7, which is shown spaced away from the gate proper in Fig. 2.

The pressure plate 7 is provided with upper and lower pressure rails 8 and 9 respectively, these pressure rails being yieldably urged against the edge portions of the film by means of rail springs 10, 11 and 12. The member 13 carried by the pressure plate is a horizontally extending non-reflecting member which leads to the lenses through which projection is had, thereby preventing the upper lens from projecting the image in the lower gate 6, and vice versa. The pressure plate 7, when in use, is held against the film in the gate 2. The specific means used for this purpose need not be described in detail as they are common to the art.

The means for intermittently advancing and registering the film 1 comprise a sprocket 15 mounted upon a shaft 16 which normally carries an intermittent sprocket in cameras, printers, etc. The normal sprocket, however, is provided with 16 teeth whereas the sprocket 15 is provided with 32 teeth. No change is made in the ordinary intermittent movement which drives the shaft 16. In other words, the same movement which normally causes a partial rotation of a driving sprocket (provided with 16 teeth) and advances the film longitudinally a distance equivalent to the height of one picture area, is utilized in driving the shaft 16.

In view of the fact that the sprocket 15 is provided with 32 teeth, then in the event the film 1 was maintained in continuous engagement with the sprocket 15, it would be longitudinally advanced a distance equivalent to the height of two adjacent picture areas during each period of movement. In the event the film 1 was constantly maintained in engagement with the sprocket 15, it would be caused to travel through the camera or printer at twice the speed of normal film so that 48 frames would pass the film gate every second instead of the normal 24 frames.

In accordance with this invention, however, the total number of frames or the total length of film intermittently advanced by the mechanism per second or per minute is the same as that normally advanced by a camera or projector but instead of advancing one frame at a time, the film should advance two frames at a time. Means are hereinafter described whereby this result can be obtained.

The shaft 16 is so positioned with respect to the plane assumed by the film 1 in the gate 2 that the film 1 lies in a plane substantially tangential to the root diameter of the sprocket 15 or the plane of the film in the gate 2 when extended intercepts a three-tooth segment of said sprocket.

The sprocket 15, furthermore, consists of two spaced sprocket wheels (as shown in Fig. 1), the width of the sprocket wheels at points adjacent the peripheries thereof being substantially equal to the width of the teeth carried by the sprocket wheels. These teeth 17, 18, 19, etc., (shown more particularly in Fig. 6) are prismatic in form, having a height only very slightly in excess of the normal thickness of the film, say a height of 0.025 inches. Moreover, the teeth 17, 18, 19, etc., preferably have a root length substantially equivalent to the height of the film perforations so as to completely fill the perforations. When film having perforations 0.0787 inches high is used, the teeth should have a root length of about 0.0785 inches. The teeth need not be of a width sufficient to completely fill the perforation, however.

The film control device, generally indicated at 20, comprises a guide member 21 pivoted at a point near the gate discharge, the center of the pivot lying in the plane of the film within the gate. The film control device is adapted to intermittently move the film into and out of registering and driving engagement with the sprocket 15.

The guide 21 may be provided with pivot pins 22 and 23 journaled in ears 24 and 25 depending from the gate 2. The inner surface of the guide 21, indicated at 26, should be positioned but slightly to one side of a plane passing through the axes of the pivots 22 and 23 so that such axes pass directly through the center of film extending from the gate 2 into the guide 21. When the shoe 21 pivots on the pins 22 and 23, a bending movement is imparted to the film only within the shoe 21 so that fluttering or longitudinal motion of the film within the gate 2 does not occur.

Attention is called to the fact that the shoe 21 lies practically in an extension of the plane occupied by the film in gate 2. Preferably, as shown, the shoe 21 has an upper straight portion and a lower straight portion, these two portions being connected by an intermediate, slightly curved portion, the radius of curvature being substantially equivalent to the radius of the sprocket 15. The guide 21 has a longitudinally extending central depression and side shoulders 27 and 27a which contact with the edge portions of the film, the picture area of the film being maintained out of contact with the guide 21. Longitudinally directed apertures 28 and 29 are formed in the shoulders 27 and 27a respectively, these apertures being adapted to receive three or four of the teeth carried by the sprocket 15.

The side portions of the guide 21 are provided with shoes 30 and 31 which extend over the edge areas of the film passing through the guide 21. These shoes 30 and 31 are yieldably urged against the bosses or edge portions 27 and 27a of the guide 21 by means of light springs 32 and 33 carried by bolts 34 and 35. The shoe 30 is not transversely movable on the guide 21 and the shoe 31 is provided with transverse apertures 36 through which the bolt 35 extends, so that the shoe 31 can be moved transversely into the position shown in Figs. 4 and 5. The shoes 30 and 31 may be provided with longitudinal slots 37 and 38 respectively, in order to provide proper clearance for the outer ends of the teeth 17, 18, 19, etc., of the sprocket 15.

Means are also provided for moving the film carried by the guide 21 into and out of engagement with the teeth of the intermittently driven sprocket 15 in timed relation to periods of movement of said sprocket. Such means may include a shaft 40 which is usually found in all film-handling machines such as cameras, projectors, etc., in the position with respect to the intermittently driven sprocket shaft 16 shown in Fig. 2. This shaft 40 normally rotates at four times the speed of the shaft 16. Under such conditions, an elliptical or two-lobed cam 41 is mounted in the shaft 40.

The guide 21 is provided with an arm 42 which carries an adjustable shoe 43 carried by the end of a threaded shaft 44 which may be locked upon the rib 45 of the arm 42 by means of the lock nut 46. The shoe 43 is held against the surface of the cam 41 by means of a spring 47 connecting the arm 42 with a stationary object, such as the eye-bolt 48 attached to a suitable portion of the frame of the camera, projector, or other machine in which the device is installed.

In operation of the device described hereinabove, the film 1 is threaded through the film gate 2 and through the film-controlling device 20 by transversely adjustably positioning the shoe 31 and inserting the film into the guide so that it is yieldingly held between the shoulder 27ª and the shoe 30 and rests upon the shoulder 27. The shoe 31 is then moved into position so as to yieldably hold the edge portion of the film on the shoulder 27. The film is then passed over the idler rollers or sprockets, take-up rollers, etc., of other portions of the film-treating machine, these additional elements not being shown on the drawings. The pressure plate 7 is then moved into operating relation with the film gate 2 and the drive mechanism started so as to intermittently drive the sprocket 15. The film control device 20 will be intermittently pivoted upon the pins 22 and 23 by reason of the cam 41. The film within the guide 21 will be brought into engagement and register with the teeth of the sprocket 15 when the sprocket is at rest. Because of the configuration of the teeth, the teeth act as registering pins as well as driving elements. While in such engagement, the sprocket 15 will be partially rotated, thereby longitudinally advancing the film 1 a distance equivalent to precisely two frames of the film. At the end of such intermittent movement, the spring 15 comes to rest, the film being in proper registered position. Thereafter, the guide 21 is again pivoted on its pins, moving the film 1 out of engagement with the teeth of the sprocket, this outward movement being caused by the revolution of the cam 41 and the pull on the spring 47. During such period of rest, projection of the images carried by the film and positioned in the gates 5 and 6 may take place. During such period, when the film is stationary, the sprocket 15 will perform another partial rotation but such rotation will not cause a longitudinal movement of the film because the film is not in engagement with the teeth of the sprocket. This free intermittent movement is due to the fact that the shaft 16 is intermittently driven by the driving mechanism which is normally employed on all strip film machines adapted to advance the film one frame at a time. At the conclusion of this free partial rotation of the sprocket 15, the cam 41 again advances or pivots the guide 21 against the driving sprocket 15, whereupon the cycle of operations can be repeated.

During the pivoting of the guide 21, any bending which takes place in the film 1 occurs either along an axis passing directly through the film or along the slight curvature intermediate the ends of the guide 21. Inasmuch as the film is yieldingly held between the guide 21 and the shoes 30 and 31 along such curved path, no longitudinal movement takes place because of the bending or pivoting movement of the guide 21. The pressure rails 8 and 9 of the gate 2 also assist in maintaining the film against longitudinal movement. The side guide rails 3 and 4 of the gate effectively prevent transverse movement of the film within the gate 2.

It is to be understood that the guide 21 may be oscillated on its pivots in any suitable manner. The size and configuration of the cam 41 depends upon the speed of rotation of the shaft 40 with respect to the speed of the shaft 16 on which the sprocket 15 is mounted. The construction of the guide 21 may be materially changed, it being highly desirable, however, that the guide 21 maintain the film approximately in an extension of the plane occupied by the film in the gate 2.

Those skilled in the art will appreciate that numerous modifications and adaptations of this invention may be made and all such changes and modifications as come within the scope of the appended claims are embraced thereby.

I claim:

1. In an apparatus for intermittently advancing film, the combination of an intermittently driven sprocket provided with teeth of prismatic form having a root length substantially equivalent to the height of film perforations; a film gate provided with side guide rails adapted to restrict transverse motion of film in said gate, said film gate lying in a plane substantially tangential to the root diameter of said sprocket; a film control device positioned between the film gate and sprocket, said film control device being pivoted at a point near the gate discharge, the center of the pivot lying in the plane of the film, said film control device being adapted to slidably receive film discharged by said gate, and means for moving said film control device on its pivot in timed relation to periods of movement of said sprocket to periodically move the film into and out of driving engagement with said intermittently driven sprocket.

2. In an apparatus for intermittently advancing strip film longitudinally, the combination of an intermittently driven sprocket; a film gate adapted to movably receive strip film, said film gate lying in a plane intercepting a three-tooth segment of said sprocket; a film control device comprising a guide pivotally positioned between the film gate and sprocket and lying substantially in an extension of the plane of the film in the gate, said guide being pivoted on an axis near the gate discharge and with its center in the plane of the film in said gate and provided with a curved portion including an arc of about three teeth on said sprocket, and means for moving said guide on its pivot in timed relation to periods of movement of said driven sprocket to periodically move the film into and out of engagement with said intermittently driven sprocket.

3. In an apparatus for intermittently advancing strip film longitudinally, the combination of an intermittently driven sprocket, a film gate adapted to movably receive strip film, said film gate lying in a plane intercepting a three-tooth segment of said sprocket; a film control device comprising a guide pivotally positioned between the film gate and sprocket and lying substantially in an extension of the plane of the film in the gate, said guide being pivoted on an axis near the gate discharge and with its center in the plane of the film in said gate and provided with a curved portion including an arc of about three teeth on said sprocket, shoes carried by said guide and yieldably pressed thereagainst, and means for moving said guide on its pivot in timed relation to periods of movement of said driven sprocket to periodically move the film into and out of engagement with said intermittently driven sprocket.

4. In an apparatus for intermittently advancing strip film longitudinally, the combination of an intermittently driven sprocket, a film gate adapted to movably receive strip film, said film gate lying in a plane intercepting a three-tooth segment of said sprocket; a film control device comprising a guide pivotally positioned between the film gate and sprocket and lying substantially in an extension of the plane of the film in the gate, said guide being pivoted on an axis near the gate discharge and with its center in the plane of the film in said gate and provided with a curved portion including an arc of about three teeth on said sprocket, shoes carried by said guide means for yieldably pressing said shoes against edge portions of film carried by said guide, means for transversely adjustably positioning one of said shoes on said guide out of contact with film on said guide, and means for moving said guide on its pivot in timed relation to periods of movement of said driven sprocket to periodically move the film into and out of engagement with said intermittently driven sprocket.

5. In an apparatus for intermittently advancing strip film longitudinally, the combination of an intermittently driven sprocket consisting of two spaced sprocket wheels provided with teeth of prismatic form having a root length substantially equivalent to the height of film perforations, the width of said sprocket wheels being equal to the width of the sprocket teeth, said teeth being narrower than the width of sprocket holes in said film, a film gate lying in a plane substantially tangential to the root diameter of said sprocket, a guide pivoted on an axis with its center in the plane of the film in said gate, and means for moving said guide on its pivot in timed relation to periods of movement of said sprocket for moving the film into and out of registering engagement with said intermittently driven sprocket.

6. In an apparatus for intermittently advancing strip film longitudinally, the combination of an intermittently driven sprocket provided with teeth of prismatic form having a root length substantially equivalent to the height of film perforations whereby said sprocket may engage with strip film and drive and register the same; a film gate adapted to movably receive strip film, said film gate lying in a plane intercepting a three-tooth segment of said sprocket; a film control device comprising a guide pivotally positioned between the film gate and sprocket and lying substantially in an extension of the plane of the film in the gate, said guide being pivoted on an axis near the gate discharge and with its center in the plane of the film in said gate and provided with a curved portion including an arc of about three teeth on said sprocket, and means for moving said guide on its pivot in timed relation to periods of movement of said driven sprocket to periodically move the film into and out of engagement with said intermittently driven sprocket.

GABRIEL GARCIA MORENO.